United States Patent
Hughes, Jr. et al.

(10) Patent No.: US 12,351,051 B1
(45) Date of Patent: Jul. 8, 2025

(54) AC BUS SWITCHING WITH MULTIPLE GRID LINE DROPS

(71) Applicant: Positron Charging LLC, Vancouver, WA (US)

(72) Inventors: Tyler Hughes, Jr., Vancouver, WA (US); Brian Breniser, Vancouver, WA (US)

(73) Assignee: Positron Charging LLC, Vancouver, WA (US)

( * ) Notice: Subject to any disclaimer, the term of this patent is extended or adjusted under 35 U.S.C. 154(b) by 0 days.

(21) Appl. No.: 19/061,545

(22) Filed: Feb. 24, 2025

Related U.S. Application Data

(63) Continuation of application No. 18/964,894, filed on Dec. 2, 2024, now abandoned.

(60) Provisional application No. 63/699,971, filed on Sep. 27, 2024.

(51) Int. Cl.
*B60L 53/30* (2019.01)
*B60L 53/62* (2019.01)

(52) U.S. Cl.
CPC ............ *B60L 53/305* (2019.02); *B60L 53/62* (2019.02)

(58) Field of Classification Search
CPC ........ B60L 53/305; B60L 53/62; B60L 53/20; B60L 53/22; B60L 53/30; B60L 53/67
See application file for complete search history.

(56) References Cited

U.S. PATENT DOCUMENTS

| 11,554,684 B2* | 1/2023 | Chow | B60L 53/31 |
| 2012/0277927 A1* | 11/2012 | Watkins | B60L 53/68 |
| | | | 700/297 |
| 2020/0290474 A1* | 9/2020 | Cashdollar | B60L 53/62 |
| 2024/0186804 A1* | 6/2024 | Heller | H02J 7/0013 |

* cited by examiner

*Primary Examiner* — David V Henze-Gongola
(74) *Attorney, Agent, or Firm* — Baker Botts L.L.P.

(57) ABSTRACT

A charging system comprising a plurality of circuit interrupters, each having a first terminal and a second terminal, the first terminal being electrically coupled to each line breaker among a corresponding plurality of line breakers that are coupled to an electric power source; a high-voltage AC power bus coupled to the second terminal of each circuit breaker among the plurality of circuit interrupters; a plurality of control boxes, each control box among the plurality of control boxes comprising a controllable charge interrupter having a first terminal coupled to the high-voltage AC power bus and a second terminal coupled to an EVSE connector; a means for control of the controllable charge interrupter; and one or more non-transitory computer-readable storage media coupled to the means for control and storing one or more sequences of instructions which when executed using the means for control cause the means for control to execute a charge management strategy.

20 Claims, 5 Drawing Sheets

AC BUS SWITCHING WITH MULTIPLE GRID LINE DROPS

CROSS-REFERENCE TO RELATED APPLICATIONS

This application claims the benefit under 35 U.S.C. § 120 as a continuation of application Ser. No. 18/964,894, filed Dec. 2, 2024, which claims the benefit under 35 U.S.C. 119(e) of provisional application 63/699,971, filed Sep. 27, 2024, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights. © 2024 Positron Charging LLC.

TECHNICAL FIELD

One technical field of the present disclosure is electric power transmission circuits and apparatus. Other technical fields are electric power charging systems and electric power charging stations for electric vehicles.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by their inclusion in this section.

Level-2 charging, for example, using the J-1772 charging standard, is the most common means of charging an electric vehicle (EV) at or near residences. Level-2 charging can also be available at businesses expecting EV owners to charge only during a visit to the business, typically a maximum of 2-3 hours for retail businesses, theaters, and arenas. Home installations do not require charge management systems.

If an EV owner does not own, lease, or occupy a detached or semidetached home, the most likely locations where the owner will charge the vehicle are an apartment building, complex, or workplace. In some of these settings, EV owners typically want fast chargers. However, charging systems for apartments and workplaces typically are bulky, difficult to use, and not designed for installation in large unit numbers.

National Electric Code (NEC) article 625, section 42, states that the rating of electric service and feeder shall be sized in connection with the total connected load and be considered continuous unless an energy management system (EMS) or adjustable amperage settings are installed or available with the service and feeder. The foregoing is a minimum requirement, but some electric power utilities do not accept EMS and require a service and feeder to be rated for the total load. When an EMS is present, if the EMS fails, then the system is non-compliant during the failure period.

Manufacturers and suppliers of EV chargers typically address the foregoing issues by networking individual charging stations together. Most chargers have only one or two plugs per power input to the charger. Suppliers add chargers, each with an individual network link to cloud-based management servers and software, to be networked together. This approach is impractical for large-scale installations at apartments or workplaces. If the existing approach is used to place a charger at every parking space of a large facility, the fees charged by the major cloud computing services become excessive. Furthermore, charging service depends upon the availability of cloud computing services, which are beyond the control of the charger supplier or the owner or operator of the facility. In a system having an EMS controlled via cloud-hosted software, each charger still requires current capacity on the facility's electrical panel, and these frequently reach capacity.

These issues have led to widely varying charging installations that are insufficient for mass deployment. High-volume EV adoption may be difficult to achieve unless every parking space of an apartment building, complex, or workplace has a charger. Based on the foregoing, the referenced technical fields have developed an acute need for better approaches to mass installations of EV charging facilities.

SUMMARY

The appended claims may serve as a summary of the invention.

DETAILED DESCRIPTION

Figure 1:
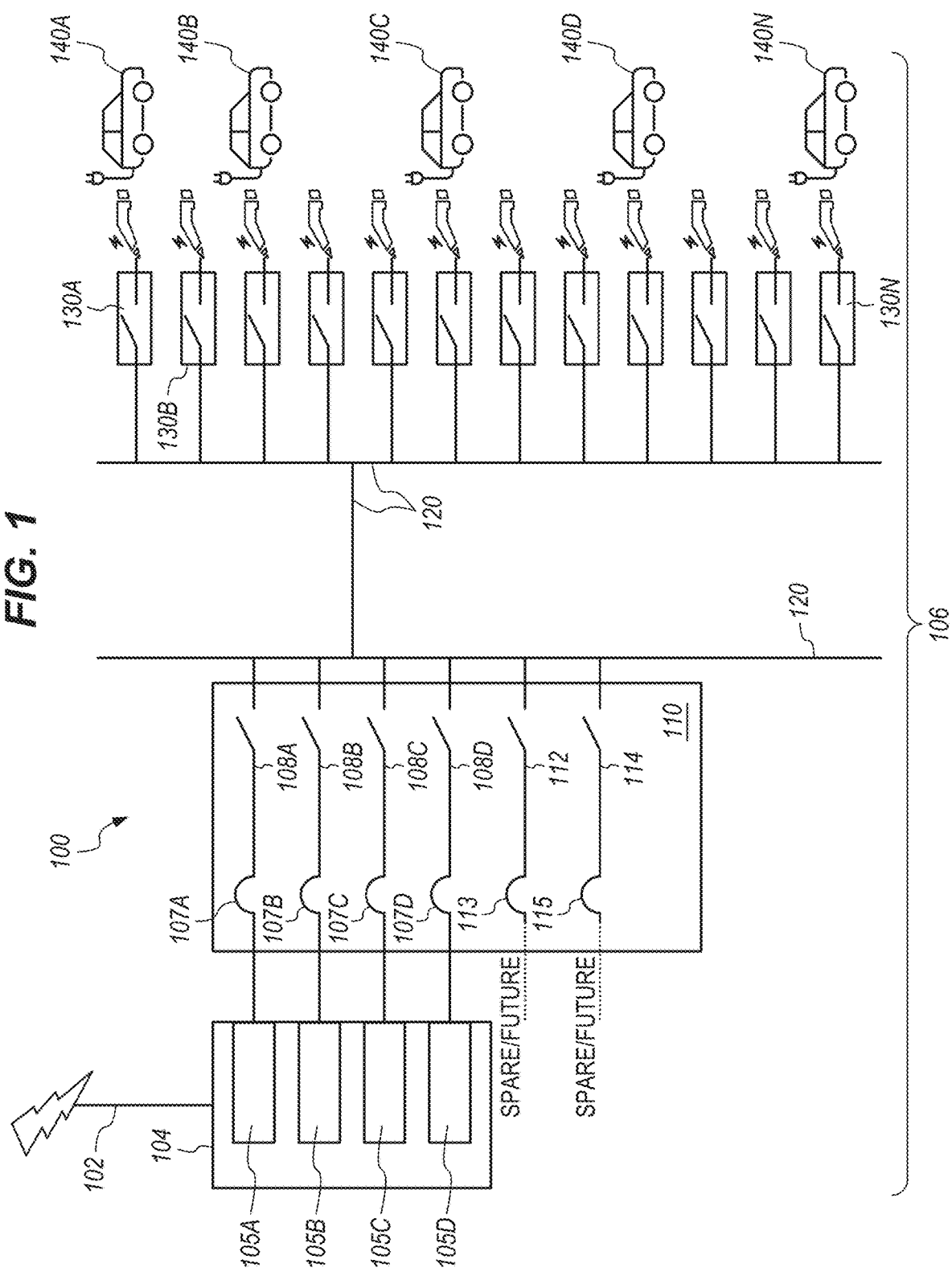
FIG. 1 is a circuit diagram of an embodiment.

Embodiments are described in sections according to the following outline:
1. Introduction
2. General Overview
3. Structural and Functional Overview

1. Introduction

In the following description, for the purposes of explanation, numerous specific details are outlined to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail outlined in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described concerning one or more particular embodiments or drawing figures, but such features are not limited to usage in the one or more particular embodiments or figures about which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

2. General Overview

With embodiments of the present disclosure, large-scale charging systems can be deployed with sufficient capacity for many EVs in apartment or workplace settings and at far lower cost. Embodiments reduce requirements for cloud-connected services and Software as a Service (SaaS) fees associated with chargers and reduce requirements for upgraded electrical panels or increased service capacity that can otherwise occur when more than about six or more chargers are installed. Embodiments are suitable for large-scale installations where, for example, about 10% or more of a parking facility needs charger installations. Embodiments also enable deploying systems with the capacity to charge every vehicle concurrently. Embodiments can include microprocessors or microcontrollers, memory, and local charge management programming optionally. For example, in mass installations with more than 10 EVs parked at an apartment building overnight, not all the EVs need to charge every night or need a full charge. Depending on EV owners' commuting patterns, charging that provides 40-50 miles of range will be sufficient. Depending on the EV, battery capacity, and other charging options, each EV may need substantially less charging per night.

Embodiments are useful in Level-2 charging deployments in many physical locations. Examples include businesses with EV parking spaces, long term parking lots, parking garages, and job-specific parking lots or spaces.

Embodiments encompass the subject matter of the following numbered clauses:

1. A charging system, comprising a plurality of circuit interrupters, each having a first terminal and a second terminal, the first terminal being electrically coupled to each line breaker among a corresponding plurality of line breakers that are coupled to an electric power source; a high-voltage AC power bus coupled to the second terminal of each circuit breaker among the plurality of circuit interrupters; and a plurality of control boxes, each control box among the plurality of control boxes comprising: a controllable charge interrupter having a first terminal coupled to the high-voltage AC power bus and a second terminal coupled to an EVSE connector; a means for control of the controllable charge interrupter; and one or more non-transitory computer-readable storage media coupled to the means for control and storing one or more sequences of instructions which when executed using the means for control cause the means for control to execute a charge management strategy.

2. The charging system of clause 1 wherein each line breaker comprises a two-pole breaker of a breaker box of a facility and wherein the electric power source is a power grid drop of the facility.

3. The charging system of clause 2 wherein each plurality comprises 10 or more.

4. The charging system of claim 1 further comprising one or more spare line interrupters.

5. The charging system of clause 1 wherein each of the circuit interrupters comprises any of a breaker, contactor, a relay, a switch, or a fuse.

6. The charging system of clause 1 wherein each of the charge interrupters comprises any of a breaker, contactor, a relay, a switch, or a fuse.

7. A charging system, as shown and described.

8. A charging system, as shown and described in any one or more paragraphs and/or any one or more drawing figures of the disclosure.

9. A computer-implemented method of charging an electric vehicle, as shown and described.

10. A computer-implemented method of charging an electric vehicle, as shown and described in any one or more paragraphs and/or any one or more drawing figures of the disclosure.

11. One or more non-transitory computer-readable storage media storing one or more sequences of instructions which, when executed using one or more processors, cause the one or more processors to execute a computer-implemented method of charging an electric vehicle, as shown and described.

12. One or more non-transitory computer-readable storage media storing one or more sequences of instructions which, when executed using one or more processors, cause the one or more processors to execute a computer-implemented method of charging an electric vehicle, as shown and described in any one or more paragraphs and/or any one or more drawing figures of the disclosure.

3. Structural & Functional Overview

3.1 Hardware Example

FIG. 1 is a circuit diagram of an embodiment. In an embodiment, a charging system 100 comprises components implemented partially by hardware at one or more computing devices, such as one or more hardware processors executing stored program instructions stored in memory for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of charge management in large-scale EV charger deployment installations or facilities. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In an embodiment, a charging system 100 comprises a power grid connection 102, such as a local electric power grid line drop, which is electrically coupled to a breaker box 104 of facility 106. The power grid connection 102 can be an existing line drop that supplies a building, garage, or other facility in which system 100 is installed. In one embodiment, breaker box 104 includes, comprises, or is electrically connected to a plurality of circuit breakers 105A, 105B, 105C, and 105D that are electrically coupled to corresponding line breakers 107A, 107B, 107C, and 107D, each providing line protection and respectively coupled to one of a plurality of circuit interrupters 108A, 108B, 108C, and 108D in a charger breaker box 110. To illustrate a clear example, FIG. 1 shows four (4) pairs of line breakers 107A, 107B, 107C, and 107D and corresponding circuit interrupters 108A, 108B, 108C, and 108D, but other embodiments can comprise any number of breakers and circuit interrupters. In various embodiments, each circuit interrupter 108A, 108B, 108C, and 108D can comprise a breaker, contactor, a relay, a switch, or a fuse.

An embodiment can rely on the current capacity needs of other elements of the system of FIG. 1 or metrics based on the total current load of the system to estimate how many total line breakers are needed in the current breaker box to supply the rest of the system. In an embodiment, circuit interrupters 108A, 108B, 108C, and 108D each comprise a two-pole breaker rated at about 50 amperes (50 A).

Optionally, the charger breaker box 110 can also comprise one or more spare line breakers. For example, FIG. 1 shows two spare line breakers, 112 and 114. Providing spare line breakers enables the expansion of the system of FIG. 1 after an initial installation. Alternatively, the spare line breakers could be deemed reserved or associated with power reserves that could be selectively activated. Each of the spare line breakers 112 and 114 can comprise a breaker, contactor, relay, switch, or fuse and can be series coupled respectively to separate breakers 113 and 115, depending on the end device or load.

The circuit interrupters 108A, 108B, 108C, and 108D are electrically coupled to a high-voltage power bus 120. Typical line voltage will be 208V or 240V AC, but 120V to 130V AC also is possible in other embodiments. In an embodiment, power bus 120 is electrically coupled to a plurality of controllable charge interrupters 130A to 130N, capable of coupling to electric vehicles 140A to 140N, where "N" in the reference numerals indicates that an embodiment can include any number of such elements. One or more electrically operable or controllable breakers, contactors, relays, switches, or fuses can be used in other embodiments as alternatives or substitutes for one or more of the plurality of controllable charge interrupters 130A to 130N. In various embodiments, any of the controllable charge interrupters 130A to 130N and/or individual circuit interrupters 108A, 108B, 108C, and 108D can be opened or closed to support the current load needs of the system.

Figure 2:
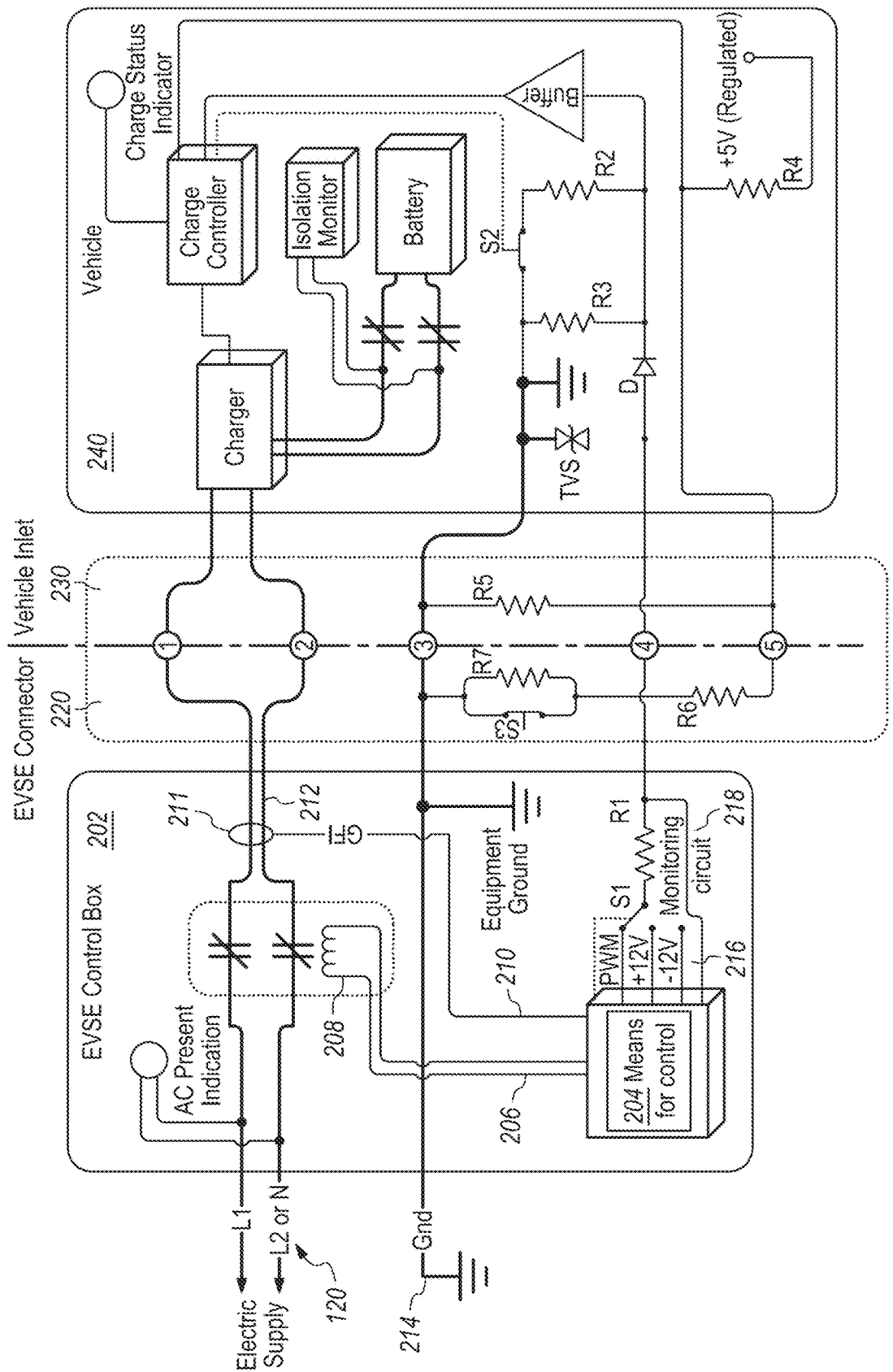
FIG. 2 is a circuit diagram schematically showing an example control box, connector, vehicle inlet, and vehicle showing additional details of FIG. 1.
Figure 5:
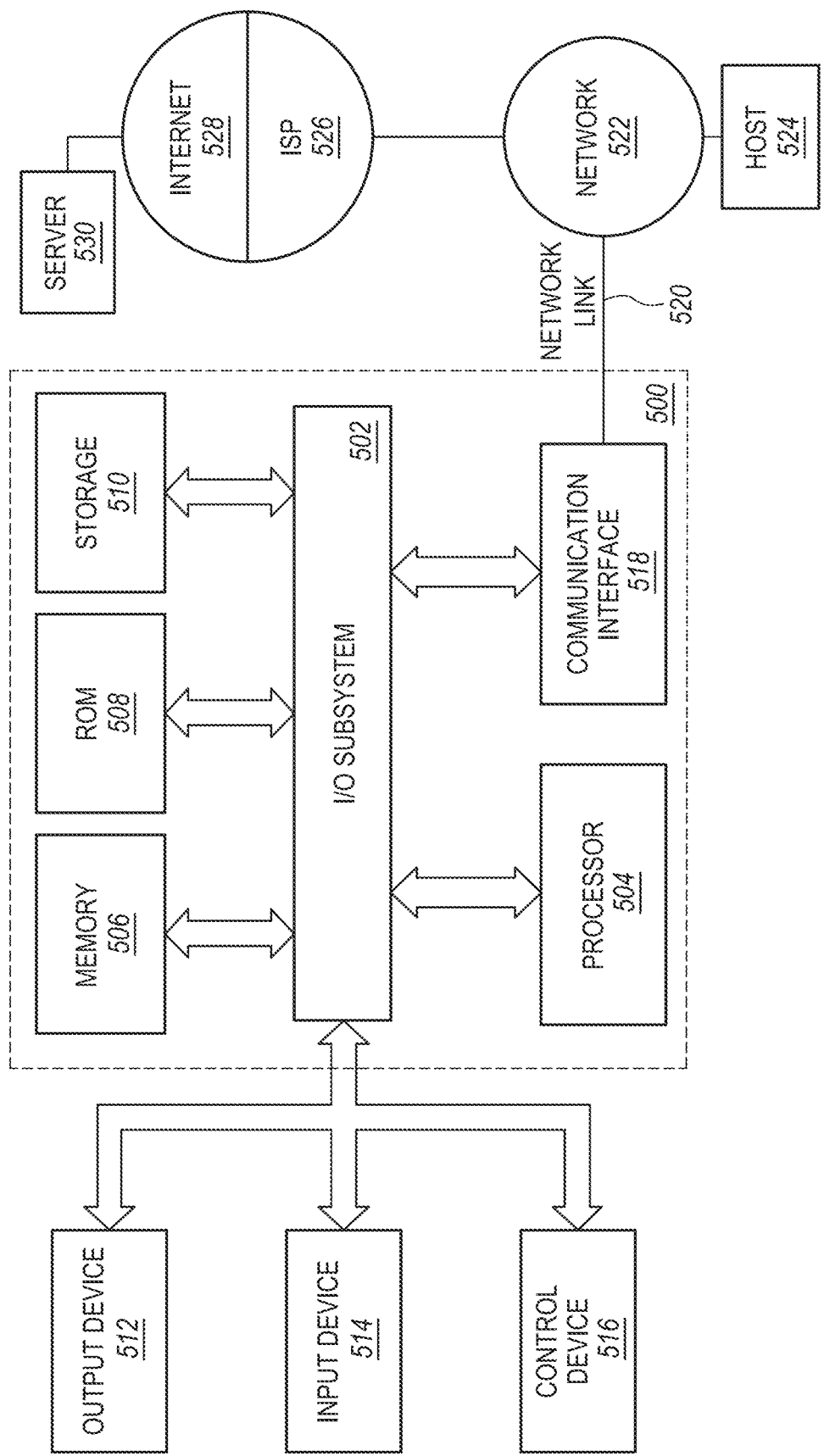
FIG. 5 is a block diagram that illustrates an example computer system with which an embodiment may be implemented.

FIG. 2 is a circuit diagram schematically showing an example control box, connector, vehicle inlet, and vehicle showing additional details of FIG. 1. In an embodiment, the power bus 120 is electrically coupled to an EVSE control box 202 having means for control 204. In various embodiments, the means for control 204 can comprise a microcomputer, microcontroller, Arduino board with compatible shields, Raspberry Pi processor board with interface circuit boards, a hard-programmed application-specific integrated circuit (ASIC), or other digital electronic processing unit, a computer as shown in FIG. 5, or any equivalent of any of the foregoing. In any such embodiment, the means for control 204 comprises an inductor driver board or circuit coupled to charger breaker control lines 206, which are coupled to an inductor 208 or solenoid of a controllable charge interrupter 130A. With this hardware, the means for control 204 can drive the inductor 208 or solenoid to selectively open or close a particular controllable charge breaker under stored program control, thereby selectively coupling or decoupling electric current to a connector and vehicle.

The means for control 204 further comprises a ground fault circuit interrupter coupled to a ground fault interrupter line 210 on, attached to, surrounding, or otherwise associated with output lines 212 of the controllable charge interrupter 130A. For example, the ground fault interrupter line 210 can terminate in a toroidal or cylindrical current sensor 211 through which the output lines 212 pass. With this arrangement, the means for control 204 can be programmed to read the current sensor via a compatible interface and, in response to detecting a ground fault, signal the controllable charge interrupter 130A to open, for example, in response to detecting that one of the output lines 212 has shorted to ground 214.

In an embodiment, the means for control 204 further comprises a monitor interface circuit or board coupled to a set of low-voltage outputs 216 coupled via switch S1 and resistor R1 through contact (4) of an EVSE connector 220 and vehicle inlet 230, thereby forming a monitoring circuit 218 that the means for control can read to verify current flow and charge activity at the connector and vehicle inlet.

In an embodiment, the means for control 204 further comprises a system clock that executes continuously and can report the current date and time in reply to a signal, poll, or other electronic request. The system clock can be coupled to NVRAM memory to record the date and time or to a networking circuit or wireless interface to read the current date and time from a server, satellite source, or other networked source.

The components shown in FIG. 2 for EVSE connector 220, vehicle inlet 230, and vehicle 240 can comprise charging components that conform to a standard. For example, in various embodiments, EVSE connector 220 can comprise a J1772-type connector and is compatible with level 2 or level 1 charging.

In various embodiments, the means for control 204 and EVSE control box 202 can be programmed to operate the control box and EVSE connector according to the J1772 charge standard. The EVSE control box 202 can communicate with vehicle 240 via Open Charge Point Protocol communications and/or PWM. Logic-level communications within the EVSE control box 202 and over the EVSE connector 220 can implement CAN bus protocols.

Figure 3:
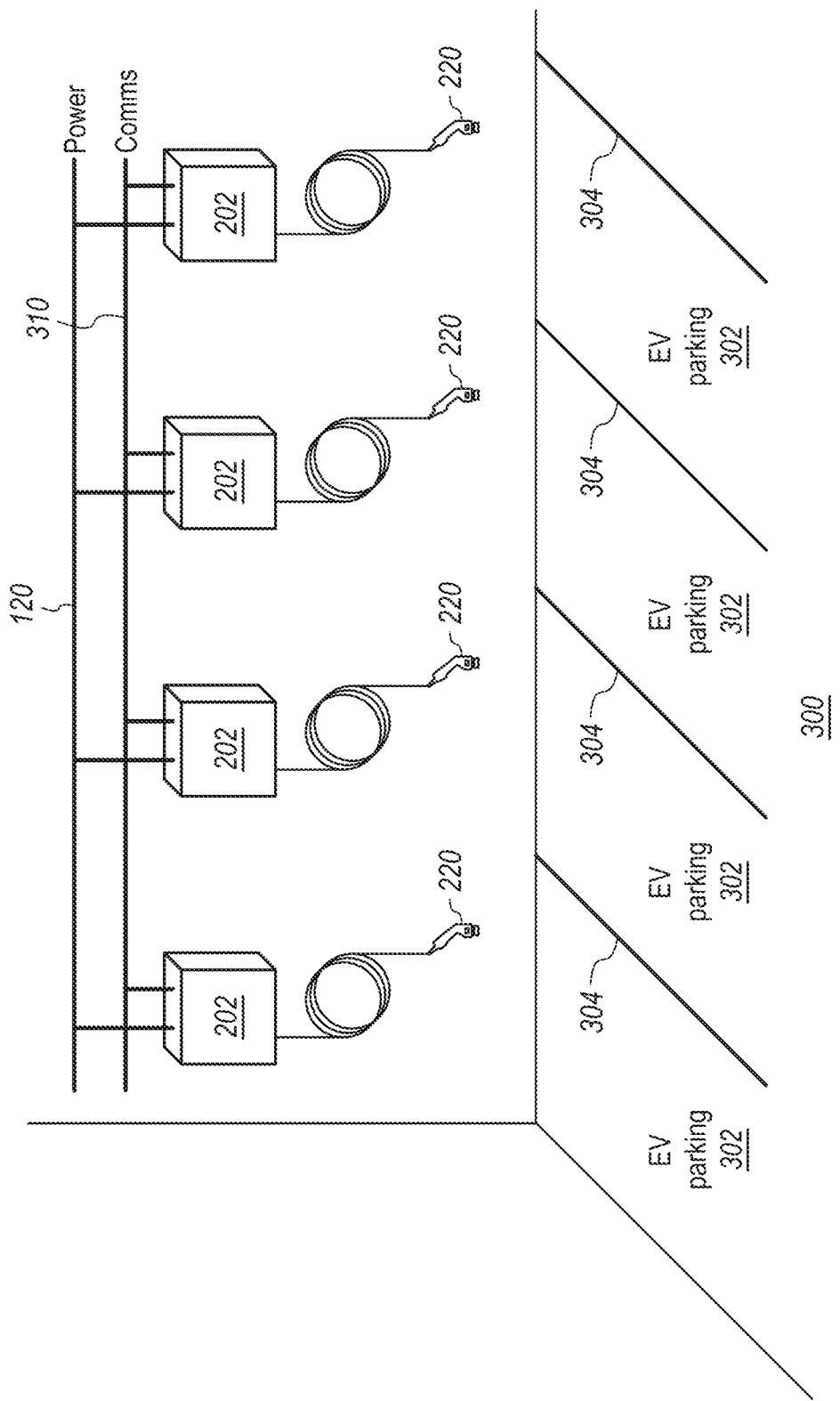
FIG. 3 illustrates an EV parking facility in one embodiment.

FIG. 3 illustrates an EV parking facility of one embodiment. In the example of FIG. 3, parking facility 300 comprises a plurality of EV parking spaces 302 divided via ground space or stall indicia 304. Each EV parking space 302 is associated with a corresponding EVSE control box 202 comprising a means for control 204 within the box and an EVSE connector 220 that can be connected to an EV in the corresponding space. To illustrate a clear example within a practical space, FIG. 3 shows four EV parking spaces, but other embodiments can include much larger numbers of EV parking spaces.

In an embodiment, the power bus 120 is coupled to each EVSE control box 202 to supply input power in the manner previously described.

A communication bus 310 is coupled to each EVSE control box 202 in an embodiment. In an embodiment, a first means for control 204 of a first EVSE control box 202 is programmed to programmatically inform the means for control of all other control boxes about a charge management strategy and/or one or more charge management actions or decisions that the first means for control executes. In one embodiment, the communication bus 310 conforms to Ethernet protocols, LAN protocols, Wi-fi protocols, Long-Term Evolution (LTE) wireless broadband protocols, or control area network (CAN) bus protocols, using wired, fiber, or wireless links. In one embodiment, communication within an EVSE control box 202 uses a CAN bus or a PWM-type protocol. For example, each means for control 204 comprises a CAN bus node, and each means for control is programmed to execute event-driven logic to transmit events on the CAN bus and to consume events that other means for control transmit. Events can specify that a particular means for control 204 has initiated charging an EV, terminated charging, or will initiate charging at a particular time for a particular period. Events can request other means for control 204 to report the periods during which they charge EVs at corresponding EV parking spaces 302, a past period of charging, a current draw of an EV currently undergoing charging or other metrics.

In an embodiment, the means for control 204 is programmed, based on the OCPP protocol, to retrieve data from the EV and/or other elements of FIG. 2, the data including but not limited to a current state of charge, a unique identifier for the car, the user or driver of the car, credit card information, and payment information. A request for an information dump or for select information could be performed on an EVSE control box 202. Furthermore, a particular embodiment or environment may require the capability to limit the current or voltage passing through the EVSE control box 202; the means for control 204 can be programmed to transmit an event instructing a box to limit its own delivery of power in one or more aspects.

3.2 Optional Hardware/Software Elements

In any of the foregoing embodiments, additional charging capacity can be added by connecting the power bus 120 to another circuit breaker of the breaker box 104 other than the circuit breakers 105A, 105B, 105C, and 105D. Adding such a breaker increases the current capacity of the power bus 120, thereby allowing adding other controllable charge interrupters 130A to 130N. Thus, additional SaaS fees are not required to supply charging capability to additional parking spots. Adding other controllable charger breakers when another circuit breaker is available in or added to breaker box 104 is approximately the same cost as a "dumb" home charger.

Optionally, system 100 of FIG. 1 could comprise one or more of:

1. A battery backup subsystem that is bi-directionally charged from the grid connection 102.
2. A backup generator.
3. A solar power source to supplement or substitute for the power grid connection 102.
4. A pedestal enclosure or a wall-mounted enclosure that contains the controllable charge contactors and all components of FIG. 2. Any such enclosure can be outdoor rated.
5. A card or contactless payment terminal to receive payment signals from payment cards, smartphones, or other devices to supply payment for charge management services.
6. An RFID card reader, for use in user identification, connecting payment information to users, user settings such as preferences, preferred charge start or stop times, connecting a user to an application for setting the foregoing parameters, connecting a user to a central terminal interface for setting the foregoing parameters, and/or setting one or more limit or threshold values, such as restricting one or more of the chargers for use only by residents.
7. An application program configured to identify cars, charge levels, and other parameters relevant to charge management.

3.3 Firmware/Software Example

In an embodiment, means for control 204 further comprises one or more non-transitory computer-readable media storing one or more sequences of stored program control instructions, which, when executed using the means for control, cause the means for control to execute a local charge management strategy, process, or algorithm to prioritize the charging of individual vehicles. Examples of computer-readable media in various embodiments include NVRAM, EPROM, EEPROM, and hard disk storage. In an embodiment, the charging algorithm is programmed to control the circuit interrupters 108A, 108B, 108C, and 108D to operate many charging spaces for a small cost to increase per space that needs to be electrified. For example, a facility could comprise 50+ charging locations but only a handful would need to be on at a time, solving both SaaS cost and capacity problems.

In an embodiment, the microcontroller is programmed according to programmatic rules, heuristics, or algorithms to improve the charging experience. Examples of programmed rules include:

1. Low-priority users can choose to defer charging for a credit;
2. Users who need to have their car topped up can pay extra or redeem credits for priority charging for a specified period.

In an embodiment, the microcontroller is programmed to initiate charging based on supplying the highest available current the most EVs. The microcontroller can be programmed to supply charging current based on a practical estimate of the range that each EV needs daily. For example, if a facility needs to ensure 40 miles/day per EV, with an average 8-hour dwell time, then each input can support charging about six EVs if every EV in the facility needs to charge. With longer dwell times and not every EV needing to charge daily, more than 10 EVs would be chargeable per day per single input.

Figure 4:
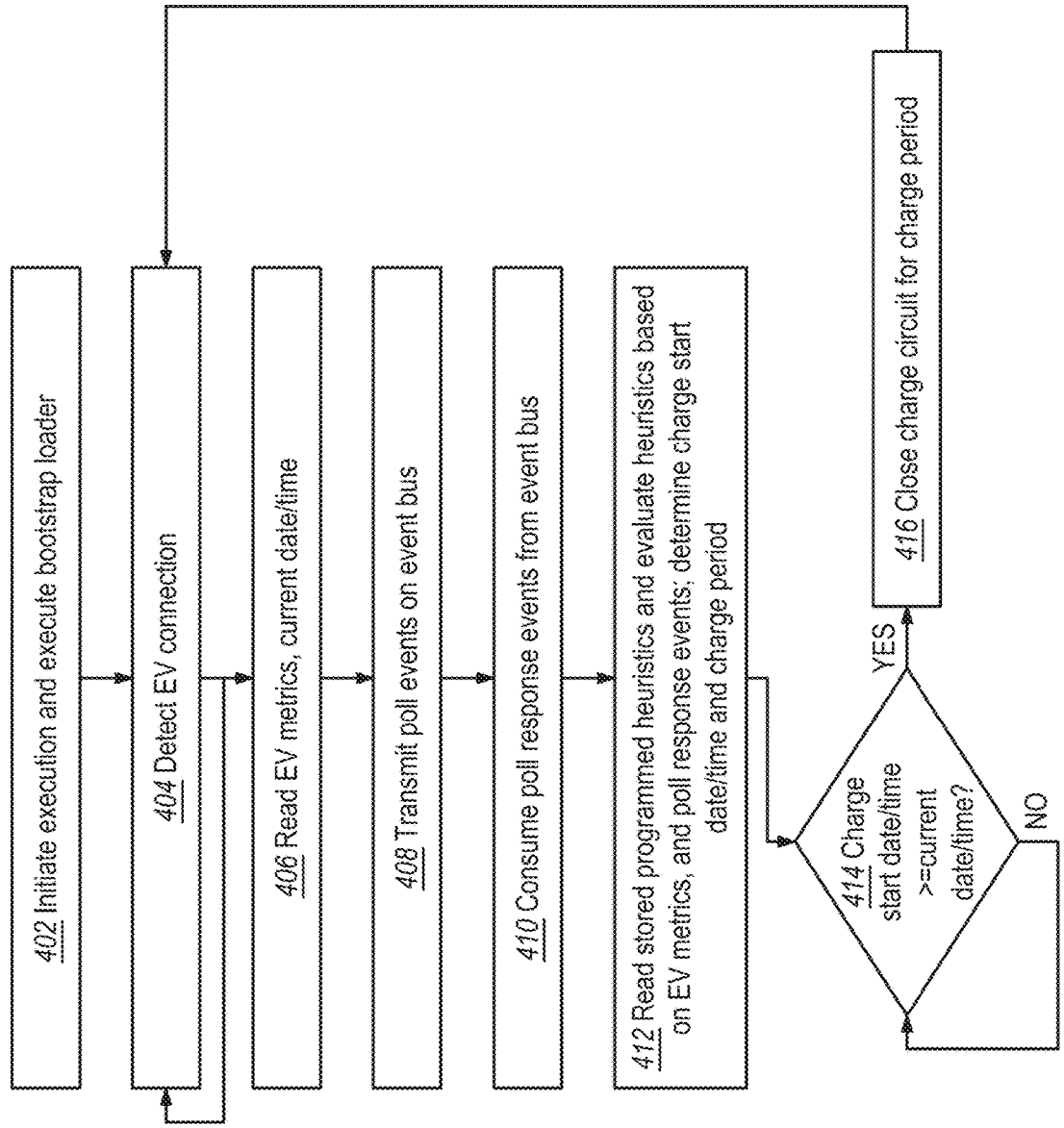
FIG. 4 illustrates an example process of operating a charging system.

FIG. 4 illustrates an example process of operating a charging system. FIG. 4 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

For one embodiment, FIG. 4 represents the primary programmed operating steps for a charge management strategy implemented using a single means for control 204 of one control box. In an embodiment, at block 402, a control box initiates execution and executes bootstrap loader functions. Block 402 can execute when power is applied to the control box, after an initial installation, or after a power failure event; aside from these events, power typically is applied continuously to the control box, which operates continuously. The bootstrap loader functions can comprise any suitable initialization functions, such as clearing scratchpad memory, loading a first set of instructions of a control program from EVRAM into processor on-board memory, sending initialization signals to peripheral boards, and sending startup signals such as a CLOSE SOLENOID signal to the charge breaker, thus ensuring that all hardware elements of the system are in an expected initialization state.

At block 404, the process of FIG. 4 is programmed to detect an EV connection. For example, block 404 can comprise the means for control 204 reading values of the monitoring circuit 218, determining whether the values indicate that the EVSE connector 220 is connected to a vehicle inlet 230 and the charging circuit of an EV, and proceeding to block 406 only if a connection is present. Block 404 can conduct a continuing loop until such a connection is detected.

At block 406, the process of FIG. 4 is programmed to read one or more metrics from the EV and the current date and time from the system clock. EV metrics can comprise current draw, battery charge level, make and model, and other data that the EV is capable of returning in reply to a poll or request.

At block 408, the process of FIG. 4 is programmed to transmit one or more poll events on the event bus of the communication bus 310. For example, the process of FIG. 4 can be programmed to transmit a first event that announces that the particular means for control 204 is participating in the event bus. In an embodiment, each means for control 204 of each control box 202 can be programmed to consume such an event and respond by transmitting a second event that reports metrics relating to that control box's operation. Example metrics include whether charging is occurring, the planned period of the charge, and current consumption.

At block 410, the process of FIG. 4 is programmed to consume poll response events from the event bus. Block 410 can comprise reading and interpreting the responsive events described in the preceding paragraph and digitally storing values from the events in the non-transitory computer-readable media.

At block 412, the process of FIG. 4 is programmed to read the stored programmed heuristics described in previous sections, evaluate the heuristics based on the EV metrics and poll response events that have been previously received, and determine a charge start date/time and charge period. For example, if a programmed heuristic specifies a condition such as "if <metric> is greater than <value>," block 412 comprises determining if the <metric> was received, what <value> was received, and whether the condition is true or false. Based on the evaluation of all such heuristics, the process of FIG. 4 is programmed to determine when the control box can or should close the controllable charge interrupters 130A to start a current flow for charging and for what period.

At block 414, the process of FIG. 4 is programmed to test whether the date/time determined at block 412 is equal to or after the current date and time based on the system clock reading obtained at block 406. If the test of block 414 is true, then control transfers to block 416 at which the process of FIG. 4 is programmed to close the circuit for the charge period.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 5 is a block diagram that illustrates an example computer system with which an embodiment may be implemented. In the example of FIG. 5, a computer system 500 and instructions for implementing the disclosed technologies in hardware, software, or a combination of hardware and software are represented schematically, for example, as boxes and circles, at the same level of detail that is commonly used by persons of ordinary skill in the art to which this disclosure pertains for communicating about computer architecture and computer systems implementations.

Computer system 500 includes an input/output (I/O) subsystem 502, which may include a bus and/or other communication mechanism(s) for communicating information and/or instructions between the components of the computer system 500 over electronic signal paths. The I/O subsystem 502 may include an I/O controller, a memory controller, and at least one I/O port. The electronic signal paths are represented schematically in the drawings, such as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system, a graphics processing unit (GPU), or a digital signal processor or ARM processor. Processor 504 may comprise an integrated arithmetic logic unit (ALU) or be coupled to a separate ALU.

Computer system 500 includes one or more units of memory 506, such as a main memory, coupled to I/O subsystem 502 for electronically digitally storing data and instructions to be executed by processor 504. Memory 506 may include volatile memory such as various forms of random-access memory (RAM) or other dynamic storage device. Memory 506 may also be used for storing temporary variables or other intermediate information during the execution of instructions to be executed by processor 504. Such instructions, when stored in non-transitory computer-readable storage media accessible to processor 504, can render computer system 500 into a special-purpose machine customized to perform the operations specified in the instructions.

Computer system 500 includes non-volatile memory such as read-only memory (ROM) 508 or other static storage devices coupled to I/O subsystem 502 for storing information and instructions for processor 504. The ROM 508 may include various forms of programmable ROM (PROM), such as erasable PROM (EPROM) or electrically erasable PROM (EEPROM). A unit of persistent storage 510 may include various forms of non-volatile RAM (NVRAM), such as FLASH memory, solid-state storage, magnetic disk, or optical disks such as CD-ROM or DVD-ROM and may be coupled to I/O subsystem 502 for storing information and instructions. Storage 510 is an example of a non-transitory computer-readable medium that may be used to store instructions and data which, when executed by the processor 504, cause performing computer-implemented methods to execute the techniques herein.

The instructions in memory 506, ROM 508, or storage 510 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 500 may be coupled via I/O subsystem 502 to at least one output device 512. In one embodiment, output device 512 is a digital computer display. Examples of a display that may be used in various embodiments include a touchscreen display, a light-emitting diode (LED) display, a liquid crystal display (LCD), or an e-paper display. Computer system 500 may include other types of output devices 512 alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections, or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. The control device 516 may be a touchpad, a mouse, a trackball, or cursor direction keys for communicating direction information and command selections to processor 504 and for controlling cursor movement on an output device 512, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 514 may include a combination of multiple input devices, such as a video camera and a depth sensor.

In another embodiment, computer system 500 may comprise an Internet of Things (IoT) device in which output device 512, input device 514, and control device 516 are omitted. Or, in such an embodiment, the input device 514 may comprise one or more cameras, motion detectors, thermometers, microphones, seismic detectors, other sensors or detectors, measurement devices or encoders, and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server computer 530.

Computer system 500 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 502. Transmission media can also be acoustic or light waves generated during radio-wave and infrared data communications.

Various forms of media may carry at least one sequence of at least one instruction to processor 504 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal, and appropriate circuitry can provide the data to I/O subsystem 502, such as placing the data on a bus. I/O subsystem 502 carries the data to memory 506, from which processor 504 retrieves and executes the instructions. The instructions received by memory 506 may optionally be stored on storage 510 before or after execution by processor 504.

Computer system 500 also includes a communication interface 518 coupled to a bus or I/O subsystem 502. Communication interface 518 provides a two-way data communication coupling to the communication bus 310 using any of the networking protocols previously identified in connection with the description of the communication bus 310, and/or to a network link(s) 520 directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 522 broadly represents a local area network (LAN), wide-area network (WAN), campus network, internetwork, or any combination thereof. Communication interface 518 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may connect through network 522 to a host computer 524.

Furthermore, network link 520 may connect through network 522 or to other computing devices via internetworking devices and/or computers operated by an Internet Service Provider (ISP) 526. ISP 526 provides data communication services through a worldwide packet data communication network called Internet 528. Network connectivity and server-based software are options for certain embodiments but are not required, and a key benefit of the circuit of FIG. 1, FIG. 2, and FIG. 3 is that SaaS-based software licenses are not mandatory to expand charging capacity.

A server computer 530 may be coupled to Internet 528 in an embodiment. Server computer 530 broadly represents any computer, data center, virtual machine, or virtual computing instance with or without a hypervisor or computer executing a containerized program system such as DOCKER or KUBERNETES. Server computer 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server computer 530 may form elements of a distributed computing system that includes other computers, a processing cluster, a server farm, or other organizations of computers that cooperate to perform tasks or execute applications or services. Server computer 530 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 530 may comprise a web application server that hosts a presentation layer, application layer, and data storage layer, such as a relational database system using a structured query language (SQL) or no SQL, an object store, a graph database, a flat file system or other data storage.

Computer system 500 can send messages and receive data and instructions, including program code, through the network(s), network link 520, and communication interface 518. In the Internet example, server computer 530 might transmit a requested code for an application program through Internet 528, ISP 526, local network 522, and communication interface 518. The received code may be executed by processor 504 as it is received and/or stored in storage 510 or other non-volatile storage for later execution.

The execution of instructions, as described in this section, may implement a process in the form of an instance of a computer program that is being executed and consisting of program code and its current activity. Depending on the operating system (OS), a process may comprise multiple threads of execution that execute instructions concurrently. In this context, a computer program is a passive collection of instructions, while a process may execute those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

What is claimed is:

1. A charging system, comprising:
    a plurality of circuit interrupters, each having a first terminal and a second terminal, the first terminal being electrically coupled to a particular line breaker among a corresponding plurality of line breakers that are coupled to an electric power source;
    a high-voltage AC power bus coupled to the second terminal of each a particular circuit interrupter among the plurality of circuit interrupters; and
    a plurality of control boxes, each control box among the plurality of control boxes comprising:
        a controllable charge interrupter having a first terminal coupled to the high-voltage AC power bus and a second terminal coupled to an EVSE connector;
        a means for control of the controllable charge interrupter; and
        one or more non-transitory computer-readable storage media coupled to the means for control and storing one or more sequences of instructions which when executed using the means for control cause the means for control to execute a charge management strategy.

2. The charging system of claim 1 wherein each line breaker comprises a two-pole breaker of a breaker box of a facility and wherein the electric power source is a power grid drop of the facility.

3. The charging system of claim 2 wherein each plurality comprises 10 or more.

4. The charging system of claim 1 further comprising one or more spare line interrupters.

5. The charging system of claim 1 wherein each of the circuit interrupters comprises any of a breaker, contactor, a relay, a switch, or a fuse.

6. The charging system of claim 1 wherein each of the charge interrupters comprises any of a breaker, a contactor, a relay, a switch, or a fuse.

7. The charging system of claim 1 wherein the EVSE connector is compatible with Level-1 or Level-2 charging.

8. The charging system of claim 1 wherein the means for control comprises a digital electronic processing unit configured to control hardware that can selectively open or close a controllable charge breaker.

9. The charging system of claim 1 wherein the means for control comprises a monitor interface circuit coupled to a set of low-voltage outputs coupled via a switch and a resistor through the EVSE connector and an EV inlet.

10. The charging system of claim 1 wherein the means for control comprises a system clock that executes continuously and can report a current date and time in reply to an electronic request.

11. The charging system of claim 1 further comprising a communication bus coupled to the plurality of control boxes and capable of carrying digital communications between control boxes.

12. The charging system of claim 11, wherein the communication bus conforms to control area network (CAN) bus protocols.

13. The charging system of claim 11, wherein the means for control is programmed to execute event-driven logic to transmit events on the communication bus and to consume events that other means for control transmit.

14. The charging system of claim 11, wherein the communication bus uses wired, fiber, or wireless links.

15. A computer-implemented method, the method comprising:
 using each control box of a charging system as recited in claim 1, measuring current flow values between the control box and an EV inlet via an EVSE connector;
 determining whether the current flow values indicate that the EVSE connector is connected to the EV inlet in an iterative manner, until the current flow values indicate a connection;
 receiving and reading one or more metrics from the EV inlet and determining a current date and time from a system clock;
 transmitting one or more electronic requests to a plurality of connected control boxes using a communication bus coupled to the control box;
 using the control box, receiving electronic request responses from the communication bus, interpreting the electronic request responses, and storing values from the electronic request responses in non-transitory computer-readable media;
 evaluating a set of programmatic rules based on the one or more metrics and electronic request responses to determine a start date and time and a charge period;
 comparing the start date and time to the current date and time in an iterative manner, until the start date and time is equal to or after the current date and time; and
 closing a controllable charge interrupter for the charge period.

16. The computer-implemented method of claim 15 wherein the electronic request responses comprise values indicating whether charging is occurring, planned charge periods, and current consumption.

17. The computer-implemented method of claim 15 wherein the metrics comprise values indicating current draw, battery charge level, and make and model of the EV.

18. A computer system comprising:
 one or more hardware processors;
 one or more non-transitory computer-readable storage media storing one or more sequences of instructions which, when executed using the one or more hardware processors, cause the processors to execute:
  using each control box of a charging system as recited in claim 1, measuring current flow values between the control box and an EV inlet via an EVSE connector;
  determining whether the current flow values indicate that the EVSE connector is connected to the EV inlet in an iterative manner, until the current flow values indicate a connection;
  receiving and reading one or more metrics from the EV inlet and determining a current date and time from a system clock;
  transmitting one or more electronic requests to a plurality of connected control boxes using a communication bus coupled to the control box;
  using the control box, receiving electronic request responses from the communication bus, interpreting the electronic request responses, and storing values from the electronic request responses in non-transitory computer-readable media;
  evaluating a set of programmatic rules based on the one or more metrics and electronic request responses to determine a start and time and a charge period;
  comparing the start date and time to the current date and time in an iterative manner, until the start date and time is equal to or after the current date and time; and
  closing a controllable charge interrupter for the charge period.

19. The computer system of claim 18 wherein the electronic request responses comprise values indicating whether charging is occurring, planned charge periods, and current consumption.

20. The computer system of claim 18 wherein the metrics comprise values indicating current draw, battery charge level, and make and model of the EV.

* * * * *